United States Patent Office 3,347,806
Patented Oct. 17, 1967

3,347,806
NEW DICYCLOPENTADIENE MODIFIED UNSATURATED POLYESTERS AND PROCESS FOR PREPARING THEM
Rolf Zimmermann, Wiesbaden-Biebrich, Germany, assignor to Chemische Werke Albert, Wiesbaden-Biebrich, Germany, a corporation of Germany
No Drawing. Filed Mar. 30, 1966, Ser. No. 538,564
Claims priority, application Germany, Feb. 17, 1961, C 23,429; Dec. 8, 1961, C 25,697
13 Claims. (Cl. 260—22)

This application is a continuation-in-part application of copending, commonly assigned application Ser. No. 172,861, filed Feb. 13, 1962, now abandoned.

This invention relates to new dicyclopenadiene modified unsaturated polyester resins, copolymerization products thereof and the preparation of said products.

The preparation of unsaturated polyesters by the reaction of polyhydric alcohols with $\alpha,\beta$-unsaturated dicarboxylic acids, which may be mixed with dicarboxylic acids containing no aliphatic unsaturation, is well known. The unsaturated polyesters so produced may be copolymerized with monomeric vinyl compounds; but for various applications, particularly the manufacture of coatings and shaped bodies, the use of these unsaturated polyesters has been found to be disadvantageous since the copolymerization of the polyester and the vinyl compound is retarded by atmospheric oxygen. This causes the formation of tacky or semi-solid surfaces, if compositions comprising such unsaturated polyesters, vinyl monomers, an organic peroxide and an accelerator are applied in a thin layer.

Various processes have been proposed for the preparation of polyesters which when copolymerized with vinyl monomers yield thin layers having substantially tack-free surfaces even if the copolymerization is effected in the presence of atmospheric oxygen. According to one of these processes unsaturated dicarboxylic acids are reacted with polycyclic polyhydric alcohols which may be obtained by subjecting dicyclopentadiene to an oxo-reaction, i.e. to the action of carbon monoxide and hydrogen, and subsequent hydrogenation.

It has also been proposed to react cyclopentadiene with unsaturated polyesters having a molecular weight of more than 2000. In this case the reaction is effected using 1 molecule of cyclopentadiene for each olefinic bond contained in the polyester. The reaction products are saturated polyesters of 3,6-endomethylene - $\Delta^4$ - tetrahydrophthalic acid formed by the Diels-Alder reaction.

I have now found that valuable unsaturated polyester resins may be prepared by the reaction of a polyhydric alcohol, an $\alpha,\beta$-unsaturated dicarboxylic acid and dicyclopentadiene in a two stage process described more fully below. The unsaturated polyesters so produced can be made to copolymerize with vinyl monomers to yield films and molded bodies having substantially tack-free surfaces even when the copolymerization is carried out in the presence of atmospheric oxygen.

According to the invention, therefore, there is provided a process for the production of unsaturated polyesters in which one or more $\alpha,\beta$-unsaturated dicarboxylic acids, or anhydrides thereof where such exist, are reacted with one or more polyhydric alcohols and dicyclopentadiene at a temperature below 140° C. until the major portion and preferably substantially all of the dicyclopentadiene has been reacted, the reaction mixture being thereafter heated to a temperature above 160° C. and maintained thereat until esterification is substantially complete.

The $\alpha,\beta$-unsaturated dicarboxylic acids or their anhydrides may be replaced in an amount of up to 50 equivalent percent by polybasic carboxylic acids and/or anhydrides thereof containing no reactive unsaturation, i.e. containing no acetylenic or polymerizable olefinic unsaturation. For example, $\gamma,\delta$- or $\delta,\epsilon$-olefinic bonds do not polymerize and, therefore, are considered to be unreactive unsaturations.

Suitable polybasic carboxylic acids which contain no acetylenic or polymerizable olefinic bond or anhydrides thereof include, for example succinic acid, adipic acid, sebacic acid, azelaic acid, ortho-, iso- or terephthalic acid or their tetra- or hexahydrogenation products; phthalic acid anhydride or tetra- or hexahydrophthalic acid anhydride, trimellitic acid, and pyromellitic acid. In those acids containing more than 2 carboxylic acid groups there should be at least two free groups but the others may be esterified by monohydric alcohols, for example by aliphatic alcohols having 1 to 6 carbon atoms. Chlorinated polybasic carboxylic acids such as tri- or tetrachlorophthalic acid may also be used. In this way special effects may be obtained.

Suitable polyhydric alcohols for use in the process according to the invention include, for example, ethylene glycol; diethylene glycol; 1,2- or 1,3-propanediol; 2,2-dialkylpropane diols, e.g. 2,2-dimethylpropane diol; butanediol - 1,3; butanediol - 1,4; $\Delta$-2,3-butenediol-1,4; hexanediol-1,6; dimethylolbenzenes and derivatives thereof with alkyl nuclear substituents; resorcinol; 4,4'-dihydroxy - diphenylalkanes; 4,4' - dihydroxy-dicyclohexylalkanes; 4,4'-dihydroxy-3,3'-diallyldiphenylalkanes, e.g. the 2,2-propanes or the methane, ethane, butane, pentane, hexane, cyclohexane or octane derivatives thereof or the corresponding derivatives substituted in 3,3'-positions by methyl, ethyl, propyl or isopropyl groups, or the bis-ethylene glycol, bispropylene glycol, or bisbutyleneglycol ethers of such compounds, or trimethylolpropane. Other suitable polyhydric alcohols include the etherification or esterification products of polyhydric alcohols containing at least three hydroxy groups in which there are two free hydroxy groups. Products containing 2 free hydroxy groups include the monoethers of glycerol, trimethylolethane or trimethylol propane with allyl alcohol, benzyl alcohol, stearyl alcohol, oleyl alcohol or mixtures of fatty alcohols; diethers of pentaerythritol and any one of the aforementioned alcohols; and esters of at least trihydric alcohols with fatty acids or other monocarboxylic acids such as those mentioned below. The addition product of cyclopentadiene with $\Delta$-2,3-butenediol-1,4, dimethylolendomethylenecyclohexenediol is also suitable for use in the process according to the invention.

If the polyhydric alcohol employed contains phenolic hydroxy groups, e.g. resorcinol or 4,4'-dihydroxydiphenylpropane, subsequent polymerization with, for example, vinyl compounds is sometimes inhibited. However, such inhibition does not occur if the phenolic hydroxy groups are etherified, e.g. by addition of the ethylene oxide or propylene oxide, and surprisingly does not occur if the phenolic nucleus contains an allyl group in the 3-position.

Suitable $\alpha,\beta$-unsaturated polybasic carboxylic acids for use in the process according to the invention include maleic, fumaric, itaconic, mesaconic and citraconic acid or anhydrides thereof where such exist. Half esters of these acids with polyhydric alcohols e.g. those described above may also be used. The half esters may be obtained by reaction of one equivalent of the unsaturated acid or its anhydride with one equivalent of the polyhydric alcohol or the corresponding alkylene oxide. The ratio between the acid equivalents and hydroxyl equivalents in the starting material generally is from 0.8 to 1 to 1 to 0.8 preferably 0.9 to 1 to 1 to 0.9.

The process according to the invention may be further modified by incorporating in the reaction mixture a minor amount, up to 60% by weight, e.g. 0.5 to 20% by weight, preferably 2 to 10% by weight based on the total weight of polybasic acids, of one or more monocarboxylic acids preferably of 7 to 18 carbon atoms, which may be either saturated or unsaturated, for example benzoic acid, fatty acids derived from drying, semi-drying or non-drying fatty oils, acrylic acid, methacrylic acid, crotonic acid. It may also be modified by incorporating in the reaction mixture a minor amount, up to 25% by weight, e.g. 0.5 to 20% by weight, preferably 2 to 10% by weight, based on the total weight of polybasic acids, of one or more monohydric alcohols which may be either saturated or unsaturated, for example butanol, higher fatty alcohols, e.g. those having 12 to 18 carbon atoms and allyl alcohol.

It has also been found that the process according to the invention may be modified by incorporating in the reactio nmixture a minor amount, up to 25% by weight, e.g. 0.5 to 20% by weight, preferably 2 to 10% by weight based on the total weight of polybasic acids, of an ester of a fatty acid, preferably one having at least 12 carbon atoms, and a polyhydric alcohol. In this case the reaction mixture may also contain monocarboxylic acids or monohydric alcohols as specified above. Polyester resins produced from such modified polyesters by copolymerization with vinyl compounds have been found to be very useful in the manufacture of large glass fibre reinforced molded articles.

Suitable esters of fatty acids and polyhydric alcohols are e.g. glycerides of natural origin such as soyabean oil, linseed oil, fish oil, cottonseed oil, tall oil, oiticica oil, boleko oil, tallow, bone fat, coco fat, coco oil, palm kernel oil, peanut oil, rapeseed oil, wood oil, and esters of fatty acids obtainable from said oils and fats with other polyhydric alcohols e.g. ethylene glycol, diethylene glycol, 1,2-propylene glycol, propane-diol-1,3, butanediol-1, 3, butanediol-1,4 and preferably with alcohols containing at least 3 hydroxy groups, e.g. trimethylolethane, trimethylolpropane, pentaerythritol and hexanetriol.

The dicyclopentadiene is conveniently used in an amount ranging from 0.05 to 0.7 mol, preferably 0.1 to 0.4 mol per mol of the polybasic carboxylic acid. Sometimes an amount of up to 1 mol may be applied. Where the said minor amount of fatty acids has been used this may be combined with the use of the said minor amounts of monocarboxylic acids or monohydric alcohols. In the case of the carboxylic acids the total amount of the carboxylic acids and the fatty acid esters should however not exceed 60% by weight, based on the total weight of polybasic acids.

The process according to the invention is conveniently effected in the presence of an esterification catalyst. Suitable catalysts are for example sulfuric acid, hydrochloric acid, zinc chloride, zinc stearate, p-toluene sulfonic acid, and particularly the arylphosphites, e.g. triphenylphosphite. These catalysts are generally used in an amount from 0.01 to 5%, preferably 0.02 to 2% by weight calculated on the total weight of polybasic acids employed. The use of such catalysts besides increasing the rate of reaction also tends to prevent discoloration of the unsaturated polyesters at elevated temperatures.

The process according to the invention is, as previously stated, carried out in two stages, i.e. in a first stage at a temperature below 140° C. and in a second stage at a temperature above 160° C. For example, the reaction mixture is first heated, e.g. for 2 to 6 hours, at 100 to 130° C. After the major portion and preferably substantially all of the dicyclopentadiene has been reacted, the mixture is heated to a temperature above 160° C., e.g. at 190 to 220° C., and held at this temperature until the reaction has been finished. If the reaction mixture would be maintained at a temperature of about 140 to 160° C., the resins would not be improved and the heating to a temperature above 160° C. could not be dispensed with. Preferably the mixture is reacted to such an extent that the acid value of the polyester is lower than 60 and, advantageously below 40. By conducting the reaction in this manner losses of dicyclopentadiene by evaporation are substantially eliminated as also is the decomposition of dicyclopentadiene to cyclopentadiene which takes place at temperatures above 140° C.

If in accordance with a known method the reaction mixture is heated directly to a temperature at or above 142° C. monomeric cyclopentadiene is formed under the reaction conditions by decomposition of the dicyclopentadiene and adds on at the double bond of the unsaturated carboxylic acids in a Diels-Alder reaction. Thus for example, by reaction with maleic acid 3,6-endomethylene-$\Delta^4$-tetrahydrophthalic acid is formed. This side reaction may occur to some considerable extent if the reactants are heated rapidly, thus causing conversion of some of the polymerizable double bonds of the resin and a consequent reduction in the reactivity of the polyesters. Products prepared by a one stage reaction at or above 140° C. are often turbid and discolored which of course is very disadvantageous in industrial applications.

It is particularly important to maintain the temperature of the reaction mixture below 142° C. in accordance with the invention in the first stage of the reaction if fumaric acid or other unsaturated dicarboxylic acids incapable of forming anhydrides are employed. If this procedure is not carried out a major portion of the dicyclopentadiene remains unreacted and is distilled off. In those cases in which the dicarboxylic acid does not form an anhydride it is advantageous to employ the monoester of the acid.

It is generally advisable to remove water formed during the reaction as it is formed. This may be effected with the aid of a stream of an inert gas, e.g. nitrogen or carbon dioxide, or of a solvent forming an azeotropic mixture with the water, such as xylene, or other entrainers.

The unsaturated polyesters produced by the process of the invention are clear colorless, solid, unsaturated substances having an acid value below 60 and generally above 10 and a hydroxy value which is generally between 0 and 20. They remain unchanged even on prolonged storage.

These unsaturated polyesters may easily be pulverised and may be dissolved or suspended in monomeric vinyl compounds.

As previously stated, the unsaturated polyesters produced by the process of the invention will copolymerize with monomeric vinyl compounds to yield so called "polyester resins." These "polyester resins" have tackfree surfaces and may be used to prepare protective coatings, molded bodies and, particularly advantageously, glass fibre laminates.

According to a further feature of the invention, therefore, there is provided a process for the preparation of a polyester resin which comprises copolymerizing an unsaturated polyester produced by the process of the invention with one or more monomeric vinyl compounds in the presence of a copolymerization catalyst.

The reaction is conveniently effected by dissolving or suspending the unsaturated polyester in the monomeric vinyl compound and adding the catalyst thereto.

Suitable monomeric vinyl compounds include, for example, styrene and nuclear alkylated or chlorinated derivatives thereof, α-methylstyrene; divinylbenzene; vinyl acetate; vinyl propionate; acrylic and methacrylic acid esters e.g. the methyl, ethyl, propyl, butyl, iso-butyl or allyl acrylates or methacrylated, allyl esters, for example diallylphthalate, allylacetate, allylpropionate, the diallyl maleates, fumarates, succinates, adipates, azelates or sebacates and triallyl phosphate and vinylpyrrolidone. All these compounds contain the group $CH_2=C<$.

The weight ratio of the vinyl monomer to polyester is generally between 4:1 and 1:9, preferably between 1:1 and 1:4.

The polymerization of the polyesters and the vinyl compounds is generally carried out in the presence of free radical forming catalysts, especially the organic peroxides. Accelerators may also be used. Suitable organic peroxides are, for example, benzoylperoxide, 2,2-dichlorobenzoylperoxide, tertbutyl peroxide or hydroperoxide, lauroylperoxide, cyclohexylhydroperoxide, cyclohexanone-peroxide, methylethylketone peroxide and tert.-butylperbenzoate.

Suitable accelerators include dimethylaniline, dimethyltoluidine, cobalt octoate, cobaltnaphthenate, laurylmercaptan.

The copoymerization is conveniently carried out at room temperature or at slightly elevated temperatures, e.g. at a temperature between 10 and 150° C. and preferably between 20 and 80° C.

It has been found possible to build in aromatic alkylol amines which act as accelerators into the unsaturated polyesters. Such alkylol amines may be formed by adding preferably 2 moles of ethylene, propylene or butylene oxide to aniline or nuclear-substituted derivatives thereof such as toluidine. In this way unsaturated polyesters are formed which copolymerize with vinyl monomers in the presence of polymerization catalysts e.g. the above-mentioned at particularly low temperatures.

The compositions according to the invention comprising a polyester produced as described above and a vinyl monomer are suitable for the manufacture of film-like coatings, knifing glazes, for coating of fibres and for the manufacture of cast resins. They may be admixed with fillers such as asbestos, ground glass, chalk, silicon carbide or saw dust. Dyestuffs and pigments may also be incorporated.

The compositions are stable even when exposed to elevated temperature. The compositions, in which the unsaturated polyesters are modified by fatty acid esters are particularly suitable for the manufacture of large size glass fibre reinforced bodies by high speed pressing in selfheated presses. In such procedure the press is under elevated pressure for 2 to 3 minutes. It is an important advantage of such compositions that glass fibre reinforced shaped bodies prepared therefrom may be easily removed from the mold and that the pressed articles do not adhere to the walls of the power press. The products obtained from the compositions according to the invention have good mechanical and dielectric properties.

Of course, in all events a mixture of several components, e.g. alcohols may be used instead of uniform compounds.

In order that the invention may be well understood the following examples are given by way of illustration only; all parts are parts by weight unless otherwise indicated.

Example 1

A mixture of 274 parts of maleic anhydride, 178 parts of phthalic acid anhydride, 248 parts of ethylene glycol, 160 parts of dicyclopentadiene and 28 parts of fish oil (acid value 0) was slowly heated in the presence of 0.5 parts triphenylphosphite in a condensation flask provided with a stirrer, a thermometer, a distilling apparatus and a gas inlet to 100 to 120° C. under a slow stream of carbon dioxide. The mixture was held at this temperature for 2 to 3 hours, then heated over a period of 2 hours to 200 to 220° C. and held at this temperature, with an increased flow of carbon dioxide, until the acid value of the mixture was below 30.

A clear, solid, easily pulverisable, light colored unsaturated polyester was obtained in almost quantitative yield. The polyester was readily soluble in vinyl monomers and had an acid value of 25 and a hydroxy value of 0.

70 parts of the polyester were dissolved in 30 parts of styrene and admixed with 2 parts of a benzoyl peroxide paste (50% strength) and 2 parts of a 5% solution of p-dimethyltoluidine in styrene. Three superimposed mats of glass fibres were impregnated with this mixture and were then pressed in a power press between 2 discs made of plastic at a pressure of 30 atmospheres (gage) and a temperature of 40° C. After a pressing time of 4 minutes the laminate could easily be taken out of the power press, i.e. it did not adhere to the mold. The mechanical properties of the laminate were good, the bending strength measured immediately after pressing was about 2400 kg./cm.$^2$.

Example 2

274 parts of maleic anhydride, 178 parts of phthalic anhydride, 248 parts of ethylene glycol, 160 parts of dicyclopentadiene and 28 parts of bone fat were reacted together in the presence of 0.4 parts of triphenyl phosphite in the manner described in Example 1. 700 parts of a light, solid, easily pulverisable unsaturated polyester having an acid value of 21 and the hydroxy value 0 were obtained.

A 70% solution of the polyester in styrene had a viscosity of 2050 centipoises. 4 parts of a 50% solution of methylethylketoneperoxide and 2 parts of cobalt naphthenate solution in styrene, having a cobalt content of 4% were added to 100 parts of said solution of the polyester. When applied to wood, films were formed to which no dust adhered after one hour and which could readily be ground and polished after 24 hours.

Example 3

1650 parts of maleic anhydride, 710 parts of phthalic anhydride, 399 parts of isophthalic acid, 1490 parts of ethylene glycol, 55 parts of linseed oil (acid value 2), and 960 parts of dicyclopentadiene were reacted together in the manner described in Example 1 in the presence of 2.2 parts of triphenylphosphite. After a total reaction time of 7 hours there were obtained 4580 parts of a solid colorless easily pulverisable unsaturated polyester having the acid value 31 and the hydroxy value 0. Glass fibre laminates were prepared from this resin in the same manner as described in Example 1. The laminates could easily be removed from the mold and were characterised by good mechanical properties and a low water absorption.

Example 4

116 parts of fumaric acid and 62 parts of ethylene glycol were heated for 2 hours to 120° C. in the apparatus described in Example 1 to produce the half ester. Then, at a temperature of 60° C., 32 parts of dicyclopentadiene and 14 parts of cocoa fat were added to the monoester. The resulting mixture was then heated at 120° C. for 2 hours and subsequently heated at a temperature of about 200° C. until the mixture had an acid value of 35. A solid easily pulverisable unsaturated polyester was obtained in good yield.

70 parts of this polyester were dissolved in 30 parts of styrene, and 2 parts of a cyclohexanone peroxide composition of 50% strength and 1 part of a solution of cobalt naphthenate in styrene having a cobalt content of 4% were then added. Shaped bodies were produced from this mixture. The bending strength values were about 1700 to 1800 kg./cm.$^2$.

Example 5

274 parts of maleic acid, 178 parts of phthalic acid, 248 parts of ethylene glycol, 200 parts of dicyclopentadiene, 68 parts of linseed oil (acid value below 5) were reacted in the manner described in Example 1 in the presence of 0.5 part of triphenylphosphite. 870 parts of a solid, light colored, easily pulverisable unsaturated polyester having the acid value 25 and the hydroxy value 0 were obtained.

Copolymerization products of this ester and vinyl monomers, i.e. vinyl toluene, diallylphthalate, the methyl, ethyl and allyl esters of methacrylic acid, obtained under the catalytic action of 3% of a solution of methylethylketone peroxide in styrene of 50% strength and of 1.5% of cobalt naphthenate solution (cobalt content of 4%) acting as accelerator were very suitable for the manufacture of glass fibre laminates using only short pressing and heating times.

Example 6

392 parts of maleic acid, 462 parts of fumaric acid, 292 parts of adipic acid, 620 parts of ethylene glycol, 350 parts of dicyclopentadiene and 120 parts of soyabean oil (acid value 0) were reacted in the presence of 0.8 part of triphenylphosphite in the manner described in Example 1. A solid, readily pulverisable, unsaturated polyester having the acid value 25 and the hydroxy value 0 was obtained in almost quantitative yield.

70 parts of the polyester were dissolved in a mixture of 28 parts of styrene and 2 parts of methylmethacrylate. Then 3 parts of a benzoyl peroxide paste containing 50% of benzoyl peroxide, and 3 parts of a 5% solution of p-dimethyltoluidine in styrene were added to the polyester solution. 3 superimposed glass fibre mats were impregnated with this mixture and then pressed in a power press at a pressure of 30 atmospheres gage and at a temperature of 40 to 50° C. The laminate could easily be removed from the mold and had good electrical and mechanical properties. The product had a notch impact strength of 22.6 cm. kg./cm.$^2$, a specific resistance of $1.2 \times 10^{14}$ ohm, a dielectric phase-angle difference of 0.010 tan δ and a surface leakage strength of T5.

Example 7

122 parts of fumaric acid, 67 parts of phthalic anhydride, 67 parts of butanediol-1,3, 45 parts of 4,4′-dihydroxydicyclohexyl-2,2-propane, 53 parts of dicyclopentadiene and 14 parts of wood oil were reacted in the presence of 1 part of zinc stearate in the manner described in Example 1. The resulting unsaturated polyester had an acid value 36 and OH value 0.

65 parts of this polyester were dissolved in 35 parts of vinyl toluene. Two parts of a cyclohexanone peroxide composition (50% in styrene) and 1 part of cobalt octoate (cobalt content 4%) were added to the solution. Shaped bodies obtained from this mixture had good mechanical and electrical properties.

Example 8

274 parts of maleic anhydride, 170 parts of phthalic anhydride, 248 parts of ethylene glycol, 160 parts of dicyclopentadiene and 23 parts of an ester (OH value 158) obtained by the esterification of linseed fatty acid with pentaerythritol were reacted in the presence of 1 part of zinc chloride catalyst as described above. The resulting polyester could be copolymerized with methylmethacrylate under the action of 3% of a paste of benzoyl peroxide (50% strength) and of 2% of dimethyltoluidine to yield a resin suitable for the production of glass fibre laminates.

Example 9

274 parts of maleic anhydride, 177 parts of phthalic anhydride, 248 parts of ethylene glycol, 40 parts of an ester obtained by esterifying terephthalic acid with 4,4′-dihydroxydiphenylpropane-bis-(hydroxyethyl)-ether, 28 parts of tall oil (acid value 0) and 140 parts of dicyclopentadiene were reacted together in the presence of 0.4 part of triphenylphosphite acting as catalyst; 765 parts of a light colored, pulverisable polyester (acid value 35) were obtained from which by copolymerization with diallylphthalate in the presence of 4% tert-butylperbenzoate and 2% of a cobalt octoate solution of a cobalt content of 4% cast bodies having a good thermal stability under load, could be obtained.

Example 10

A mixture of 68.7 parts of maleic anhydride, 44.4 parts of phthalic anhydride, 65 parts of ethylene glycol and 35.6 parts of dicyclopentadiene to which 70 parts of xylene had been added as a water entrainer were maintained for 7 hours at 55 to 60° C. in a flask provided with a condenser, stirrer and a separator for water formed. The mixture was then heated for 6 hours to 105° C. and was thereafter maintained for 14 hours at 180° C. After that time the theoretical amount of water had been formed. After distilling off the xylene in vacuo a solid unsaturated pulverisable polyester (acid value 16) was obtained.

65 parts of this polyester were dissolved in 35 parts of styrene and mixed with 4 parts of paste of cyclohexanone peroxide (content 50%) and 2 parts of a 10% cobalt-naphthenate solution. From this mixture film-like coatings could be produced which, even in layers of 100 microns were substantially tackfree and did not discolor on heating. The films gelled after only 4 minutes and after 30 to 50 minutes were so dry that no dust adhered to them. After 24 hours they showed a surface hardness such that when measured with the pendulum test device according to W. König (see "Farbe und Lack," volume 59 (1953), page 435) the pendulum oscillated with unchanged amplitude for 80 to 100 seconds.

Example 11

A mixture of 76 parts of maleic anhydride, 29 parts of phthalic anhydride, 77 parts of propyleneglycol-1,2 and 60 parts of dicyclopentadiene were reacted together as described in Example 10.

35 parts of the resulting resin were powdered and dissolved in 15 parts of styrene, together with 1 part of a methylethylketone peroxide composition (50% strength) and 1 part of a 10% solution of cobalt naphthenate. A cast body could be made which could be taken out of the mold after 3 hours and had good mechanical and electrical properties.

Example 12

68.7 parts of maleic anhydride, 44.4 parts of phthalic anhydride, 35.6 parts of dicyclopentadiene, 59 parts of ethylene glycol and 23.6 parts of 4,4′-dihydroxy-dicyclohexyl-2,2-propane were reacted together as described in Example 10. A solid unsaturated polyester was obtained which did not polymerize even on prolonged storage.

Film-like coatings could be obtained from a solution of 6 parts of this polyester in 4 parts of styrene to which 0.4 part of a cyclohexanone peroxide composition (50% content) and 0.2 part of a solution of cobalt naphthenate (10% content) had been added. When applied to wood, glass or metal the coatings were dry enough after 30 minutes for no dust to adhere thereto, and after 24 hours they have a hard tack-free surface. The application to the said surfaces may be improved by the addition of small amounts of a silicone oil or melamine resin acting as course furthering agents.

Example 13

59 parts of maleic anhydride, 45 parts of phthalic anhydride, 14 parts of adipic acid, 45 parts of ethylene glycol, 27 parts of butylene-glycol-1,3, 31 parts of 4,4′-dihydroxydiphenyl-2,2-propane-bis-glycol-ether and 55 parts of dicyclopentadiene were reacted together as described in Example 10. A solid unsaturated polyester was obtained in almost quantitative yield. The resin did not polymerize even on prolonged storage and could readily be pulverised.

70 parts of this polyester were dissolved in a mixture of 24 parts of styrene and 6 parts of methyl methacrylate and then mixed with 4 parts of a cyclohexanone peroxide paste (50% content in styrene) and 2 parts of a cobalt naphthenate solution (10% content). Equal portions of this solution and glass fibres were processed to yield a laminate and the hardened shaped body had a completely tack-free surface and a bending strength of 3400 kg./cm.$^2$.

Example 14

412 parts of maleic anhydride, 414 parts of phthalic anhydride, 266 parts of propanediol-1,2, 217 parts of ethylene glycol, 245 parts of dicyclopentadiene and 35 parts of allyl alcohol were reacted together for 3 hours at 110 to 130° C. while under a stream of carbon dioxide.

The temperature was then increased over a period of 2 hours to 190° C. and this temperature was maintained until the acid value of the unsaturated polyester was 35. The yield of polyester was 1410 parts and the OH value of the polyester was 0.

70 parts of this ester were dissolved in 30 parts of styrene and 4 parts of cyclohexanone peroxide paste (50% content in styrene) and 2 parts of a solution of cobalt naphthenate in styrene (cobalt content 4%) were then added thereto. From this mixture films of a thickness of 500 microns were prepared on wood. These coatings were dry enough within 20 minutes for no dust to adhere thereto and could be ground and polished only 3 hours after their preparation.

*Example 15*

274 parts of maleic anhydride, 178 parts of phthalic anhydride, 248 parts of ethylene glycol, 160 parts of dicyclopentadiene and 23 parts of dehydrated castor oil fatty acid (acid value 180) were reacted together in the melt in the presence of 0.8 part of zinc chloride in the manner described in the preceding example. After a reaction time of about 8 hours there were obtained 751 parts of a polyester having the acid value 25 and the hydroxy value 0.

On copolymerization of this ester with styrene or other vinyl monomers shaped bodies could be obtained which dried on exposure to air and had good mechanical properties.

The same reaction was repeated with the exception that instead of dehydrated castor oil fatty acid 23 parts of cocoa fatty acid, having the acid value 250, were used. A light colored, pulverisable polyester resin of acid value of 24 was then obtained. This product could be copolymerized in the same manner with vinyl monomers e.g. styrene as described above.

*Example 16*

274 parts of maleic anhydride, 178 parts of phthalic anhydride, 248 parts of ethylene glycol, 160 parts of dicyclopentadiene and 23 parts of n-octadecyl alcohol were reacted together in the presence of 0.8 part of zinc stearate catalyst in a first stage at 110 to 140° C. and then in second stage above 160° C., e.g. at 190 to 200° C., until the acid value of the unsaturated ester was below 35.

A light, very reactive unsaturated polyester was obtained which when copolymerized with vinyl monomers was suitable for the preparation of tack-free drying film-like coatings and shaped bodies.

Instead of n-octadecyl alcohol there may also be used other fatty alcohols of at least 10 carbon atoms.

*Example 17*

At first an amine compound is prepared as follows: 30.2 g. of (N-β-hydroxyethyl)-p-toluidine, 19.7. g. of ethylene bromide and 16.8 g. of sodium bicarbonate were refluxed with 100 ml. of water for 40 hours. The organic layer was separated, freed in vacuo from residues of the starting material and precipitated two times from ethanol with water. 20.1 g. of bis-[(N-β-hydroxyethyl)-p-toluidinol]-ethane-1,2 of the melting point 109–10° C. were obtained (N: calculated 8.54%, found 7.97%).

137 g. of maleic anhydride, 87 g. of phthalic anhydride, 65 g. of ethylene glycol, 80 g. of propylene glycol-1,2 and 1 g. of triphenylphosphite first were heated to 110° C. until a half ester was formed. Thereafter 20 g. of dicyclopentadiene were added and the temperature was kept for 2 hours at 110 to 120° C. Then the mixture was mixed with 2.5 g. of the amine obtained according to the method described above and the temperature was raised during 3 hours to 200° C. This temperature was kept until the polyester had an acid value of about 65. Then the product was subjected to vacuum, cooled down after about 15 minutes to 150° C., 0.075 g. of hydroquinone were added and it was cooled down to 100° C. 150 g. of styrene were added to the unsaturated polyester in which the amine was built in. The solution formed had a solids content of 71.3%, an acid value of 31, a viscosity of 1115 cps. and the color value 5–6. The accelerating effect is shown by the following description of an examination of reactivity.

10 g. of this solution were well mixed in a test tube with 2% of a 50% benzoylperoxide paste (in dibutylphthalate). The reactivity was measured with a thermometer in a thermostat kept at 20° C. The pot life was 12–14 minutes. Calculated from the beginning of the gelling, the hardening occurred during 2½ minutes, a maximum temperature of 126° C. being found.

If the reactivity was tested in a thermostat kept to 15 or 10° C. respectively, the pot lives were prolonged to about 18 (15° C.) and 25 minutes (10° C.). The maximum temperature was about 90° C. (with 15° C.) and 75° C. (with 10° C.). The hardening occurred in about 5 (with 15° C.) or 8 (with 10° C.) minutes respectively always calculated from the beginning of the gelling.

Similar results might also be obtained with the other accelerators mentioned in Examples 1 to 18.

The hardening at a temperature below 20° C. is especially important for the manufacture of concrete coatings and for the use in the free atmosphere, e.g. for knifing glazes and for auto repairs.

The resins of this invention may of course easily be dyed to have any desired tint, as well by dye-stuffs soluble in said resins as by pigments insoluble therein.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What is claimed is:

1. In a process for the production of unsaturated polyester resins by reacting in several steps a mixture consisting of
   (A) at least one compound selected from the group consisting of ($A_1$) α,β-ethylenically unsaturated dicarboxylic acids, ($A_2$) anhydrides thereof, ($A_3$) mixtures of any one of the said unsaturated compounds ($A_1$) and ($A_2$), with up to an equal equivalent amount of at least one polybasic carboxylic acid containing no polymerisable aliphatic unsaturation, ($A_4$) mixtures of any one of the said unsaturated compounds ($A_1$) and ($A_2$) with up to an equal equivalent amount of at least one anhydride of a polybasic carboxylic acid containing no polymerisable aliphatic unsaturation, and ($A_5$) mixtures of any one of the said unsaturated compounds ($A_1$) and ($A_2$) with up to an equal equivalent amount of a mixture of (a) at least one polybasic carboxylic acid containing no polymerisable aliphatic unsaturation and (b) at least one anhydride thereof, with
   (B) at least one dihydric alcohol in which the hydroxyl groups will be esterified by (A) component,
   (C) dicyclopentadiene,
   (D) 0 to 60% by weight based on the total weight of polybasic acids of at least one monocarboxylic acid having 7 to 18 carbon atoms,
   (E) 0 to 25% by weight, based on the total weight of polybasic acids, of at least one monohydric alcohol, having 3 to 18 carbon atoms,
   (F) 0 to 25% by weight, based on the total weight of polybasic acids, of at least one ester of a fatty acid and a polyhydric alcohol and when (F) is other than 0,
   (G) a combination of one of the components (D) and (E) with component (F), the weight of such combination however not exceeding 60% by weight, based on the total weight of polybasic acids; the improvement which comprises reacting 0.05 to 1 mole of dicyclopentadiene per mole of the polybasic carboxylic acid with the said starting materials in a first stage at a temperature in the range from 100 to 140° C. until a major portion of the dicyclopentadiene has been reacted, the reaction mixture being thereafter heated in a second stage to a temperature in the range from 160° to 220° C. and maintained thereat until the acid value is less than 60.

2. Unsaturated polyester resins produced by the process of claim 1.

3. The unsaturated polyester resin of claim 2 in intimate mixture with a liquid polymerizable ethylenically unsaturated monomer.

4. A polymerization product of the polyester resin of claim 2 with a polymerisable ethylenically unsaturated monomer in a weight ratio from 4:1 to 1:9.

5. Glass fibre laminated with the polymerization product of claim 4.

6. A process as claimed in claim 1, wherein the unsaturated polyester resins obtained according to the process of claim 1 are copolymerized with a polymerisable ethylenically usaturated monomer in a ratio from 4:1 to 1:9 by weight in the presence of a polymerisation catalyst.

7. A process as defined in claim 6, wherein the monocarboxylic acid of component (D) is a dehydrated castor oil fatty acid and the ester of component (F) is a glyceride of a fatty acid of at least 12 carbon atoms.

8. A process as defined in claim 6 wherein said second stage of the reaction is continued until the acid value of the polyester is less than 60 and above 10 and the hydroxy value is between 0 and 20.

9. A process as defined in claim 6, wherein the unsaturated dicarboxylic acid is employed in the form of a half ester thereof with one equivalent of a dihydric alcohol.

10. A process as defined in claim 6, wherein the dicyclopentadiene is applied in an amount of 0.05 to 0.7 mole per mole of the polybasic acid.

11. A process as defined in claim 6, wherein the first stage in the reaction of dicyclopentadiene with the other starting materials is carried out at a temperature in the range from 100 to 130° C.

12. A process as claimed in claim 6, wherein the polybasic carboxylic acid containing no polymerizable aliphatic unsaturation is a dicarboxylic acid and wherein the ethylenically unsaturated monomer and the unsaturated polyester are copolymerized in a ratio from 1:1 to 1:4 by weight in the presence of a free radical generating catalyst and an accelerator.

13. A process as defined in claim 12, wherein the polymerization is effected in the presence of a free radical polymerization catalyst and an accelerator for said polymerization at a temperature of from 10 to 150° C.

References Cited

UNITED STATES PATENTS

| 2,593,976 | 4/1952 | Burrell et al. | 260—16 |
| 2,671,070 | 3/1954 | Knapp | 260—22 |
| 2,873,226 | 2/1959 | Davies et al. | 161—195 |
| 3,154,460 | 10/1964 | Graner et al. | 161—195 |

FOREIGN PATENTS

| 658,621 | 2/1963 | Canada. |
| 1,265,767 | 5/1961 | France. |
| 1,317,444 | 2/1963 | France. |
| 710,513 | 6/1954 | Great Britain. |
| 925,078 | 1/1963 | Great Britain. |
| 968,910 | 9/1964 | Great Britain. |
| 1,027,871 | 4/1958 | Germany. |
| 1,150,203 | 6/1963 | Germany. |

OTHER REFERENCES

Handbook of Chemistry & Physics, C. D. Hodgman, Editor, Published by Chemical Rubber Publishing Co., 39th edition, pages 707, 898, and 899 (1958).

DONALD E. CZAJA, *Primary Examiner.*

LEON J. BERCOVITZ, *Examiner.*

F. McKELVEY, *Assistant Examiner.*